(12) United States Patent
He et al.

(10) Patent No.: US 12,537,631 B2
(45) Date of Patent: Jan. 27, 2026

(54) RESOURCE ALLOCATION METHOD AND APPARATUS, AND TERMINAL

(71) Applicant: VIVO MOBILE COMMUNICATION CO., LTD., Guangdong (CN)

(72) Inventors: Ranran He, Guangdong (CN); Yanxia Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 349 days.

(21) Appl. No.: 18/312,106

(22) Filed: May 4, 2023

(65) Prior Publication Data
US 2023/0275704 A1    Aug. 31, 2023

Related U.S. Application Data

(63) Continuation of application No. PCT/CN2021/140308, filed on Dec. 22, 2021.

(30) Foreign Application Priority Data

Dec. 25, 2020 (CN) .......................... 202011567182.2

(51) Int. Cl.
*H04W 72/14* (2009.01)
*H04L 1/1829* (2023.01)

(52) U.S. Cl.
CPC .......... *H04L 1/1854* (2013.01); *H04L 1/1864* (2013.01)

(58) Field of Classification Search
CPC ... H04L 1/1822; H04L 1/1854; H04L 1/1864; H04L 1/1893
See application file for complete search history.

(56) References Cited

U.S. PATENT DOCUMENTS

| 2019/0007176 A1 | 1/2019 | Ozturk et al. | |
| 2022/0239415 A1* | 7/2022 | Narayanan Thangaraj | ................. H04L 1/1812 |
| 2022/0279541 A1* | 9/2022 | Kim | ...................... H04W 72/21 |

FOREIGN PATENT DOCUMENTS

| CN | 113647035 A | 11/2021 |
| CN | 113678531 A | 11/2021 |
| WO | 2018119749 A1 | 7/2018 |
| WO | 2020207737 A1 | 10/2020 |

(Continued)

OTHER PUBLICATIONS

Nokia, Nokia Shanghai Bell, Discussion on LCP procedure for NTN, 3GPP TSG-RAN WG2 Meeting #107bis, R2-1913388, Oct. 14-18, 2019, Chongqing, China.

(Continued)

*Primary Examiner* — Phuc H Tran
(74) *Attorney, Agent, or Firm* — Price Heneveld LLP (57) ABSTRACT

Embodiments of this application disclose a resource allocation method and apparatus and a terminal, where the method includes: obtaining a first uplink grant for new transmission by a terminal; and performing resource allocation for a resource designated by the first uplink grant, according to at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes.

18 Claims, 3 Drawing Sheets

(56) References Cited

FOREIGN PATENT DOCUMENTS

WO    WO-2020223453 A2 * 11/2020 ............ H04W 72/23

OTHER PUBLICATIONS

Huawei, Hisilicon, Remaining issues on sidelink LCP procedure, 3GPP TSG-RAN WG2 #107bis, R2-1913711, Oct. 14-18, 2019, Chongqing, China.
CMCC et al., "Further consideration on HARQ configuration in NTN", 3GPP TSG-RAN WG2 Meeting 107bis, R2-1914197, Revised on R2-1913975, Chongqing, Oct. 14-18, 2019.

* cited by examiner

RESOURCE ALLOCATION METHOD AND APPARATUS, AND TERMINAL

CROSS-REFERENCE TO RELATED APPLICATIONS

This application is a continuation application of PCT International Application No. PCT/CN2021/140308 filed on Dec. 22, 2021, which claims priority to Chinese Patent Application No. 202011567182.2, filed in China on Dec. 25, 2020 and entitled "RESOURCE ALLOCATION METHOD AND APPARATUS, AND TERMINAL", which are incorporated in their entireties by reference herein.

TECHNICAL FIELD

This application pertains to the field of communication technologies and specifically relates to a resource allocation method and apparatus, and a terminal (which may include a resource allocation apparatus and terminal).

BACKGROUND

In uplink transmission, a terminal obtains an allocated uplink resource by receiving an uplink grant transmitted by a network side device. Subsequently, the terminal further needs to determine, according to a logical channel prioritization (Logical Channel Prioritization, LCP) procedure, data of which logical channels can be transmitted on the allocated uplink resource.

The media access control (Media Access Control, MAC) multiplexing function means that the MAC layer multiplexes data from multiple different logical channels onto a same transport channel, for example, radio link control service data units (Radio Link Control Service Data Unit, RLC SDU) from multiple logical channels may need to be placed in a same media access control protocol data unit (Media Access Control Protocol Data Unit, MAC PDU).

In non-terrestrial network (Non-Terrestrial Networks, NTN) scenarios, a network side device may disable hybrid automatic repeat request (Hybrid Automatic Repeat Request, HARQ) uplink retransmission for dynamic scheduling due to long propagation delay of the network. In this case, still using the logical channel prioritization procedure to perform MAC multiplexing may affect the quality of service of data streams. Therefore, it is necessary to provide a new solution for resource allocation for uplink grants.

SUMMARY

Embodiments of this application provide a resource allocation method and apparatus.

According to a first aspect, a resource allocation method is provided. The method includes: obtaining a first uplink grant for new transmission by a terminal; performing resource allocation for a resource designated by the first uplink grant, according to at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes.

According to a second aspect, a resource allocation apparatus is provided, including: an obtaining module configured to obtain a first uplink grant for new transmission; and a resource allocation module configured to perform resource allocation for a resource designated by the first uplink grant, according to at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes.

According to a third aspect, a terminal is provided, where the terminal includes a processor, a memory, and a program or instructions stored on the memory and capable of running on the processor, and when the program or instructions are executed, the method according to the first aspect is implemented.

According to a fourth aspect, a readable storage medium is provided, where the readable storage medium stores a program or instructions, and when the program or instructions are executed, the method according to the first aspect is implemented.

In a fifth aspect, a computer program product is provided, where the computer program product is stored on a non-transient storage medium, and when the computer program product is executed by a processor, the method according to the first aspect is implemented.

In a sixth aspect, a chip is provided, where the chip includes a processor and a communication interface, the communication interface is coupled to the processor, and the processor is configured to run a program or instructions to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the data used in such a way is interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more. In addition, "and/or" in the specification and claims represents at least one of connected objects, and the character "/" generally indicates that the contextually associated objects have an "or" relationship.

It should be noted that technologies described in the embodiments of this application are not limited to a long term evolution (Long Term Evolution, LTE) or LTE-Advanced (LTE-Advanced, LTE-A) system, and may also be applied to other wireless communications systems, for example, code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (New Radio, NR) system is described for an illustration purpose, and NR terms are used in most of the following descriptions, although these technologies may also be applied to other applications than an NR system application, for example, the 6th generation (6th Generation, 6G) communication system.

Figure 1:
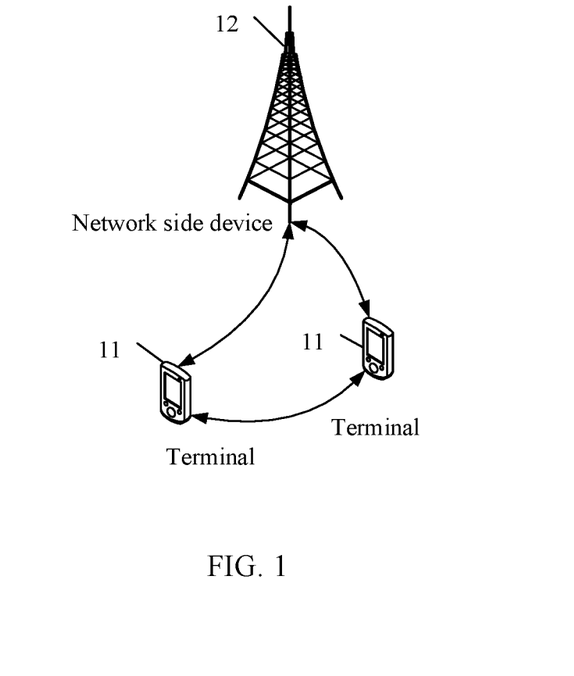
FIG. 1 is a schematic diagram of a wireless communication system according to an embodiment of this application.

FIG. 1 is a schematic diagram of a wireless communication system to which an embodiment of this application may be applied. The wireless communication system includes a terminal 11 and a network side device 12. The terminal 11 may also be referred to as a terminal device or user equipment (User Equipment, UE), and the terminal 11 may be a terminal-side device, such as a mobile phone, a tablet computer (Tablet Personal Computer), a laptop computer (Laptop Computer) or a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device) or vehicle user equipment (VUE), or pedestrian user equipment (PUE). The wearable device includes a wrist band, earphones, glasses, or the like. It should be noted that the terminal 11 is not limited to any specific type in the embodiments of this application. The network side device 12 may be a base station or a core network. The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a next generation NodeB (gNB), a home NodeB, a home evolved NodeB, a WLAN access point, a Wi-Fi node, a transmitting receiving point (Transmitting Receiving Point, TRP), or another appropriate term in the art. Provided that a same technical effect is achieved, the base station is not limited to any specific technical term. It should be noted that in the embodiments of this application, the base station in the NR system is merely used as an example, and a specific type of the base station is not limited.

The following describes in detail a resource allocation method and apparatus and a terminal provided by the embodiments of this application by using specific embodiments and application scenarios thereof with reference to the accompanying drawings.

Figure 2:
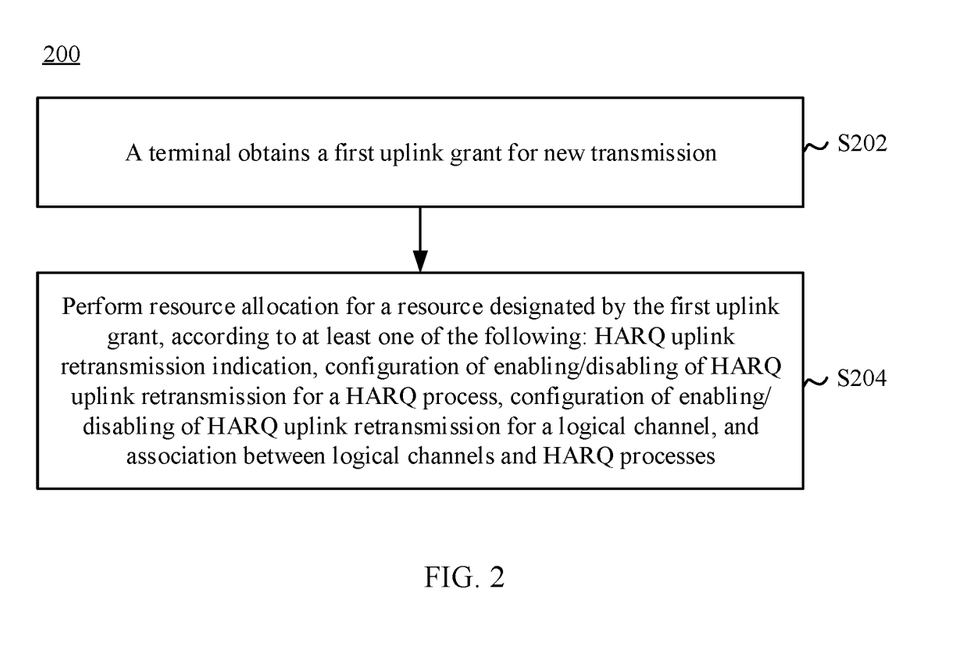
FIG. 2 is a schematic flowchart of a resource allocation method according to an embodiment of this application.

As shown in FIG. 2, an embodiment of this application provides a resource allocation method 200. The method may be performed by a terminal. In other words, the method may be performed by software or hardware installed on the terminal. The method includes the following steps.

S202. The terminal obtains a first uplink grant (UL grant) for new transmission.

In this embodiment, a network side device can allocate an uplink transmission resource to the terminal through configured grants (Configured Grants). In this way, in S202 the terminal can obtain the first uplink grant based on the configuration by the network side device, and the first uplink grant can be used for scheduling newly transmitted data, that is, the first uplink grant is not used for scheduling retransmitted data. Optionally, the network side device can configure a HARQ uplink retransmission indication associated with the first uplink grant, and the HARQ uplink retransmission indication can be used to indicate that the first uplink grant is for scheduling transmission with HARQ uplink retransmission disabled, or to indicate that the first uplink grant is for scheduling transmission with HARQ uplink retransmission enabled.

Optionally, the network side device may further configure an association between the first uplink grant and a HARQ process. The HARQ process is identified by a HARQ process ID, and the first uplink grant may be associated with one HARQ process.

Optionally, the network side device may further configure enabling HARQ uplink retransmission for a HARQ process or disabling HARQ uplink retransmission for a HARQ process.

Optionally, the network side may also configure an association between logical channels and HARQ processes. One logical channel may be associated with one or more HARQ processes, where the HARQ process is identified by a HARQ process ID.

In this embodiment, the network side device may alternatively allocate an uplink transmission resource to the terminal through dynamic scheduling (Dynamically allocate), such that in S202 the terminal may receive scheduling signaling used for indicating the first uplink grant. The scheduling signaling may be downlink control information (Downlink Control Information, DCI), and the first uplink grant can be used for scheduling newly transmitted data, that is, the first uplink grant is not used for scheduling retransmitted data.

Optionally, the scheduling signaling may further include a hybrid automatic repeat request (Hybrid Automatic Repeat Request, HARQ) uplink retransmission indication associated with the first uplink grant. The HARQ uplink retransmission indication may be used to indicate that the first uplink grant is for scheduling transmission with HARQ uplink retransmission disabled, or to indicate that the first uplink grant is for scheduling transmission with HARQ uplink retransmission enabled.

Optionally, the scheduling signaling may further include an identification (ID) of a target HARQ process. The target HARQ process is associated with a configuration of enabling or disabling of HARQ uplink retransmission, and the configuration of enabling or disabling of uplink retransmission for the target HARQ process may be configured by the network side device or prescribed by a protocol. Typically, a HARQ process (including the target HARQ process herein) is identified by a HARQ process ID, and the HARQ process ID can identify a unique HARQ process.

S204. Perform resource allocation for a resource designated by the first uplink grant, according to at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes.

Disabling HARQ uplink retransmission as mentioned in each embodiment of this specification may include: the network side device does not need to perform retransmission with grants based on a decoding status of uplink data of the terminal. For example, the network side device does not perform retransmission with grants for uplink data regardless of whether the uplink data is decoded successfully or not.

Enabling HARQ uplink retransmission as mentioned in each embodiment of this specification may include: the network side device needs to perform retransmission with grants based on a decoding status of uplink data of the terminal. For example, in a case of a decoding failure of some uplink data, the network side device needs to perform retransmission with grants for the uplink data decoded unsuccessfully.

For example, in this step, resource allocation may be performed for a resource designated by the first uplink grant, according to the configuration of enabling or disabling of HARQ uplink retransmission for a logical channel and the feature of enabling or disabling of HARQ uplink retransmission as indicated by the HARQ uplink retransmission indication. For example, based on whether the above two match or are the same, resource allocation is performed for the resource designated by the first uplink grant. Specifically, for example, in the case that the above two match or are the same, data of the logical channel corresponding to the former can be multiplexed into a media access control protocol data unit (Media Access Control Protocol Data Unit, MAC PDU) corresponding to the first uplink grant, meaning that the data of the logical channel corresponding to the former is allowed to be transmitted on a resource designated by the first uplink grant, where the "former" mentioned herein is the configuration of enabling or disabling of HARQ uplink retransmission for a logical channel.

In this example, in a configured grant (Configured Grants) scenario, the HARQ uplink retransmission indication may be configured by the network side device; and in a dynamic scheduling (Dynamically allocate) scenario, the HARQ uplink retransmission indication may be indicated by scheduling signaling.

In this example, the "feature of enabling or disabling of HARQ uplink retransmission as indicated by the HARQ uplink retransmission indication" may mean that the HARQ uplink retransmission indication is used to indicate that the first uplink grant is for scheduling transmission with HARQ uplink retransmission disabled, or the HARQ uplink retransmission indication is used to indicate that the first uplink grant is for scheduling transmission with HARQ uplink retransmission enabled.

The "configuration of enabling or disabling of HARQ uplink retransmission for a logical channel" in this example may mean that the logical channel is configured with uplink retransmission enabled or is configured with uplink retransmission disabled.

Specifically, for example, in a case that the HARQ uplink retransmission indication is used to indicate that the first uplink grant is for scheduling transmission with HARQ uplink retransmission disabled, only data of a logical channel configured with HARQ uplink retransmission disabled can be multiplexed into MAC PDU corresponding to the first uplink grant, meaning that only the data of the logical channel configured with HARQ uplink retransmission disabled is allowed to be transmitted on the resource designated by the first uplink grant; and in a case that the HARQ uplink retransmission indication is used to indicate that the first uplink grant is for scheduling transmission with HARQ uplink retransmission enabled, only data of a logical channel configured with HARQ uplink retransmission enabled can be multiplexed into the MAC PDU corresponding to the first uplink grant, meaning that only the data of the logical channel configured with HARQ uplink retransmission enabled is allowed to be transmitted on the resource designated by the first uplink grant.

In a second example, in this step, resource allocation may be performed for the resource designated by the first uplink grant, based on the configuration of enabling or disabling of HARQ uplink retransmission for a logical channel and the configuration of enabling or disabling of HARQ uplink retransmission for a HARQ process. For example, based on whether the above two match or are the same, resource allocation is performed for the resource designated by the first uplink grant. Specifically, for example, in a case that the above two match or are the same, data of a logical channel corresponding to the former can be multiplexed into MAC PDU corresponding to the first uplink grant, that is, data of the logical channel corresponding to the former is allowed to be transmitted on the resource designated by the first uplink grant, where the "former" mentioned herein is the configuration of enabling or disabling of HARQ uplink retransmission for a logical channel.

The HARQ process in this example may be a HARQ process associated with the first uplink grant. In a configured grant (Configured Grants) scenario, the HARQ process is associated with the first uplink grant, and in a dynamic grant (Dynamically allocate) scenario, the HARQ process can be scheduled by the first uplink grant.

The "configuration of enabling or disabling of HARQ uplink retransmission for a logical channel" in this example may mean that the logical channel is configured with uplink retransmission enabled or is configured with uplink retransmission disabled.

The "configuration of enabling or disabling of HARQ uplink retransmission for a HARQ process" in this example may mean that the HARQ process is configured with uplink retransmission enabled or is configured with uplink retransmission disabled.

Specifically, for example, in a case that a target HARQ process scheduled by the first uplink grant is configured with HARQ uplink retransmission disabled, only a logical channel configured with HARQ uplink retransmission disabled is allowed to be multiplexed into MAC PDU corresponding to the first uplink grant, that is, only data of the logical channel configured with HARQ uplink retransmission disabled is allowed to be transmitted on the resource designated by the first uplink grant; and in a case that a target HARQ process scheduled by the first uplink grant is configured with HARQ uplink retransmission enabled, only a logical channel configured with HARQ uplink retransmission enabled is allowed to be multiplexed into MAC PDU corresponding to the first uplink grant, that is, only data of the logical channel configured with HARQ uplink retransmission enabled is allowed to be transmitted on the resource designated by the first uplink grant.

In a third example, in this step, resource allocation may be performed for the first uplink grant, based on the association between logical channels and HARQ processes. For example, in a case that a logical channel is associated with a HARQ process indicated by scheduling signaling, data of the logical channel can be multiplexed into MAC PDU corresponding to the first uplink grant, that is, data of the logical channel is allowed to be transmitted on the resource designated by the first uplink grant.

The HARQ process mentioned in this example can be a HARQ process associated with the first uplink grant. In a configured grant (Configured Grants) scenario, the HARQ process is associated with the first uplink grant, and in a dynamic grant (Dynamically allocate) scenario, the HARQ process can be scheduled by the first uplink grant.

An example of the association between logical channels and HARQ processes is: in a case that a logical channel is configured with a HARQ process ID list, the logical channel is associated with a HARQ process identified by the HARQ process ID list configured for the logical channel, where one HARQ process ID identifies one HARQ process.

This example is specifically, for example, that the logical channel is allowed to be multiplexed into MAC PDU corresponding to the first uplink grant only in a case that the HARQ process ID list configured for the logical channel contains a HARQ process ID corresponding to a target HARQ process, meaning that data of the logical channel is allowed to be transmitted on the resource designated by the first uplink grant; where the target HARQ process is a HARQ process associated with the first uplink grant.

In the above three examples, at least one of the following three may be prescribed by a protocol or configured/pre-configured by a network side device: configuration of enabling or disabling of HARQ uplink retransmission for a HARQ process, configuration of enabling or disabling of HARQ uplink retransmission for a logical channel, and association between logical channels and HARQ processes.

In fact, the above three examples can also be used in any combination to achieve resource allocation for the first uplink grant. For example, in a case of the combination of the first example and the third example, that is, resource allocation for the resource designated by the first uplink grant is performed based on configuration of enabling or disabling of HARQ uplink retransmission for a logical channel, configuration of enabling or disabling of HARQ uplink retransmission for a HARQ process, and association between logical channels and HARQ processes. Specifically, for example, in a case that a configuration of enabling or disabling of HARQ uplink retransmission for a target logical channel matches a feature of enabling or disabling of HARQ uplink retransmission as indicated by the HARQ uplink retransmission indication, and the target logical channel is associated with a target HARQ process, data of the target logical channel is allowed to be transmitted on the resource designated by the first uplink grant.

The resource allocation for the resource designated by the first uplink grant in the foregoing examples may be specifically performed by means of a selection rule to select logical channels whose data is allowed to be transmitted on the resource designated by the first uplink grant. For example, the selection rule may be: data of a logical channel with HARQ uplink retransmission enabled and data of a logical channel with HARQ uplink retransmission disabled are not simultaneously multiplexed into MAC PDU corresponding to the first uplink grant, that is, either the data of the logical channel with HARQ uplink retransmission enabled is multiplexed into the MAC PDU corresponding to the first uplink grant, or the data of the logical channel with HARQ uplink retransmission disabled is multiplexed into the MAC PDU corresponding to the first uplink grant.

In the resource allocation method provided by the embodiments of this application, the terminal may perform resource allocation for the resource designated by the first uplink grant, based on at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes. The embodiments of this application provide an effective solution for resource allocation in the case of enabling or disabling HARQ uplink retransmission, thereby enhancing communication effectiveness.

In addition, the case of enabling or disabling of HARQ uplink retransmission is considered in the embodiments of this application, such that best efforts are made to avoid simultaneously multiplexing data of a logical channel with HARQ uplink retransmission enabled and data of a logical channel with HARQ uplink retransmission disabled into the MAC PDU corresponding to the first uplink grant, thereby improving the quality of service of data streams.

The following provides three solutions as examples to illustrate in detail S204 in the method 200 in the embodiment.

Solution 1: The performing resource allocation for a resource designated by the first uplink grant, according to at least one of the following in S204 includes: in a case that a configuration of enabling or disabling of HARQ uplink retransmission for a target logical channel matches the feature of enabling or disabling of HARQ uplink retransmission as indicated by the HARQ uplink retransmission indication, allowing data of the target logical channel to be transmitted on the resource designated by the first uplink grant, where the HARQ uplink retransmission indication is used to indicate that the first uplink grant is for scheduling transmission with HARQ uplink retransmission disabled or transmission with HARQ uplink retransmission enabled.

The target logical channel mentioned in the example may be one or more of the logical channels used by the terminal.

That a configuration of enabling or disabling of HARQ uplink retransmission for a target logical channel matches the feature of enabling or disabling of HARQ uplink retransmission as indicated by the HARQ uplink retransmission indication may include at least one of the following: the configuration for the target logical channel is enabling HARQ uplink retransmission, and the HARQ uplink retransmission indication is used to indicate that transmission with HARQ uplink retransmission enabled is to be scheduled; and the configuration for the target logical channel is disabling HARQ uplink retransmission, and the HARQ uplink retransmission indication is used to indicate that transmission with HARQ uplink retransmission disabled is to be scheduled.

In solution 1, the terminal may further obtain the configuration of enabling or disabling of HARQ uplink retransmission for the target logical channel using at least one of the following manners: pre-definition (such as prescription by a protocol), configuration by a network side device, and pre-configuration by a network side device. For example, it is prescribed by a protocol or configured by a network side device that configurations for a logical channel 1 and a logical channel 2 are disabling HARQ uplink retransmission and that configurations for a logical channel 3 and a logical channel 4 are enabling HARQ uplink retransmission.

Solution 2: The performing resource allocation for a resource designated by the first uplink grant, according to at least one of the following in S204 includes: in a case that a configuration of enabling or disabling of HARQ uplink retransmission for a target logical channel matches a configuration of enabling or disabling of HARQ uplink retransmission for a target HARQ process, allowing data of the target logical channel to be transmitted on the resource designated by the first uplink grant, where the target HARQ process is a HARQ process associated with the first uplink grant.

That a configuration of enabling or disabling of HARQ uplink retransmission for a target logical channel matches a configuration of enabling or disabling of HARQ uplink retransmission for a target HARQ process includes at least one of the following: the configuration for the target logical channel is enabling HARQ uplink retransmission, and the configuration for the target HARQ process is enabling HARQ uplink retransmission; and the configuration for the target logical channel is disabling HARQ uplink retransmission, and the configuration for the target HARQ process is disabling HARQ uplink retransmission.

In solution 2, the terminal may further obtain the configuration of enabling or disabling of HARQ uplink retransmission for the target logical channel using at least one of the following manners: pre-definition (such as prescription by a protocol), configuration by a network side device, and pre-configuration by a network side device. For example, it is prescribed by a protocol or configured by a network side device that configurations for a logical channel 1 and a logical channel 2 are disabling HARQ uplink retransmission and that configurations for a logical channel 3 and a logical channel 4 are enabling HARQ uplink retransmission.

In solution 2, the terminal may further obtain the configuration of enabling or disabling of HARQ uplink retransmission for the target HARQ process using at least one of the following manners: pre-definition (such as prescription by a protocol), configuration by a network side device, and pre-configuration by a network side device. For example, it is prescribed by a protocol or configured by a network side device that configurations for a HARQ process 1 and a HARQ process 2 are disabling HARQ uplink retransmission and that configurations for a HARQ process 3 and a HARQ process 4 are enabling HARQ uplink retransmission.

Solution 3: The performing resource allocation for a resource designated by the first uplink grant, according to at least one of the following in S204 includes: in a case that a target logical channel is associated with a target HARQ process, allowing data of the target logical channel to be transmitted on the resource designated on the first uplink grant, where the target HARQ process is a HARQ process associated with the first uplink grant.

The target logical channel includes a HARQ process ID list; where the association between the target logical channel and the target HARQ process includes that the target HARQ process has an ID located within the HARQ process ID list. Typically, a HARQ process (including the target HARQ process herein) is identified by a HARQ process ID, and the HARQ process ID can identify a unique HARQ process.

In solution 3, the terminal may further obtain a HARQ process ID list configured for the target logical channel, using at least one of the following manners: pre-definition (such as prescription by a protocol), configuration by a network side device, and pre-configuration by a network side device. For example, it is prescribed by a protocol or configured by a network side device that a HARQ process ID list maintained for a logical channel 1 includes HARQ process ID 1 and HARQ process ID 2 and that a HARQ process ID list maintained for a logical channel 2 includes HARQ process ID 3 and HARQ process ID 4.

To illustrate in detail the resource allocation method provided by the embodiments of this application, the following provides descriptions with three specific embodiments.

Embodiment 1

In this embodiment, the terminal (UE) determines logical channels that can be multiplexed into MAC PDU corresponding to the first uplink grant, based on a HARQ uplink retransmission indication associated with the first uplink grant in scheduling signaling (such as DCI) and configuration of enabling or disabling of HARQ uplink retransmission for each logical channel of the terminal, that is, determines data of which logical channels is allowed to be transmitted on the resource designated by the first uplink grant. This embodiment includes the following steps.

Step 1. The UE obtains the following information:
(1) the first uplink grant of this UE; and
(2) a HARQ uplink retransmission indication associated with the first uplink grant, where the HARQ uplink retransmission indication is used for one of the following: indicating that the first uplink grant is for scheduling transmission with HARQ uplink retransmission disabled, or indicating that the first uplink grant is for scheduling transmission with HARQ uplink retransmission enabled.

For example, in step 1, the UE listens to downlink control channels and obtains scheduling signaling (such as DCI), where the scheduling signaling contains at least the foregoing two items, and this example is applicable to dynamic scheduling (Dynamically allocate) scenarios.

For another example, in step 1, the UE obtains the foregoing two items based on configuration information. This example is applicable to configured grant (Configured Grants) scenarios.

Disabling HARQ uplink retransmission means that the network side does not need to schedule retransmission based on a decoding status of uplink transmission data of the UE; and enabling HARQ uplink retransmission means that the network side needs to schedule retransmission based on a decoding status of uplink transmission data of the UE.

The HARQ uplink retransmission indication may be 1 bit with a value of either 0 or 1 and may include one of the following cases.

(1) The value of the HARQ uplink retransmission indication associated with the first uplink grant being 1 indicates that the first uplink grant is used to schedule transmission with HARQ uplink retransmission disabled; and the value of the HARQ uplink retransmission indication associated with the first uplink grant being 0 indicates that the first uplink grant is used to schedule transmission with HARQ uplink retransmission enabled.

(2) The value of the HARQ uplink retransmission indication associated with the first uplink grant being 1 indicates that the first uplink grant is used to schedule transmission with HARQ uplink retransmission enabled; and the value of the HARQ uplink retransmission indication associated with the first uplink grant being 0 indicates that the first uplink grant is used to schedule transmission with HARQ uplink retransmission disabled.

Step 2. In a case that the first uplink grant is for scheduling newly transmitted data, the UE first needs to determine, based on DCI received, a logical channel that can be transmitted on the uplink transmission resource designated by the first uplink grant, for example, the UE needs to select a logical channel that is to be multiplexed into the MAC PDU corresponding to the first uplink grant. At least the following judgment principle is included.

Data of a logical channel can be allowed to be multiplexed into the MAC PDU corresponding to the first uplink grant only in a case that a configuration of enabling or disabling of HARQ uplink retransmission for the corresponding logical channel is the same as a configuration of enabling or disabling of HARQ uplink retransmission as indicated by the HARQ retransmission configuration indication associated with the first uplink grant, meaning that the data of the corresponding logical channel is allowed to be transmitted on the resource designated by the first uplink grant.

A configuration of enabling or disabling of HARQ uplink retransmission for each logical channel may be one of the following:

(1) prescribed by a protocol; and
(2) configured/pre-configured by a network side device. For example, in a case that the network side device configures/pre-configures a logical channel 1 with HARQ uplink retransmission enabled, the logical channel 1 can transmit only data with HARQ uplink retransmission enabled; and in a case that the network side device configures/pre-configures the logical channel 1 with HARQ uplink retransmission disabled, the logical channel 1 can transmit only data with HARQ uplink retransmission disabled.

A specific example for step 2 is: in a case that the HARQ retransmission indication indicates that the first uplink grant is used to schedule transmission with HARQ uplink retransmission disabled, a logical channel is allowed to be multiplexed into the MAC PDU corresponding to the first uplink grant only when configuration of enabling or disabling of HARQ uplink retransmission for the logical channel is the same as configuration of enabling or disabling of HARQ uplink retransmission as indicated by the HARQ retransmission indication, meaning that data of the corresponding logical channel is allowed to be transmitted on the resource designated by the first uplink grant. More specifically, data of a logical channel 1 and logical channel 2 is allowed to be multiplexed into the MAC PDU corresponding to the first uplink grant only in a case that the logical channel 1 and logical channel 2 are configured with HARQ uplink retransmission disabled, meaning that the data of the logical channel 1 and logical channel 2 is allowed to be transmitted on the resource designated by the first uplink grant; and in a case that configurations for a logical channel 3 and a logical channel 4 are enabling HARQ uplink retransmission, the logical channel 3 and the logical channel 4 are not allowed to be multiplexed into the MAC PDU corresponding to the first uplink grant, meaning that data of the logical channel 3 and logical channel 4 is not allowed to be transmitted on the resource designated by the first uplink grant.

In a case that the HARQ retransmission indication is used to indicate that the first uplink grant is used to schedule transmission with HARQ uplink retransmission enabled, a logical channel is allowed to be multiplexed into the MAC PDU corresponding to the first uplink grant only when configuration of enabling or disabling of HARQ uplink retransmission for the corresponding logical channel is the same as the configuration of enabling or disabling of HARQ uplink retransmission as indicated by the HARQ retransmission indication, meaning that only the logical channel configured with HARQ uplink retransmission enabled is allowed to be multiplexed into the MAC PDU corresponding to the first uplink grant. More specifically, in a case that a logical channel 1 and a logical channel 2 are configured with HARQ uplink retransmission disabled, the logical channel 1 and the logical channel 2 are not allowed to be multiplexed into the MAC PDU corresponding to the first uplink grant, meaning that data of the logical channel 1 and logical channel 2 is not allowed to be transmitted on the resource designated by the first uplink grant; and in a case that configurations for a logical channel 3 and a logical channel 4 are enabling HARQ uplink retransmission, the logical channel 3 and the logical channel 4 are allowed to be multiplexed into the MAC PDU corresponding to the first uplink grant, meaning that data of the logical channel 3 and logical channel 4 is allowed to be transmitted on the resource designated by the first uplink grant.

Embodiment 2

In this embodiment, the UE determines a logical channel that can be multiplexed into the MAC PDU corresponding to the first uplink grant, based on configuration of enabling or disabling of HARQ uplink retransmission for each HARQ process, a configuration of enabling or disabling of HARQ uplink retransmission for each logical channel, and a HARQ process ID indicated by scheduling signaling, that is, determines logical channel data that is allowed to be transmitted on the resource designated by the first uplink grant. This embodiment includes the following steps.

Step 1. The UE obtains the following information:
(1) the first uplink grant of this UE; and
(2) a first HARQ process scheduled by the first uplink grant, where the first HARQ process is identified by a first HARQ process ID, and the first HARQ process corresponds to the target HARQ process in the previous embodiment.

For example, in step 1, the UE listens to downlink control channels and obtains scheduling signaling (such as DCI), where the scheduling signaling contains at least the foregoing two items, and this example is applicable to dynamic scheduling (Dynamically allocate) scenarios.

For another example, in step 1, the UE obtains the foregoing two items based on configuration information. This example is applicable to configured grant (Configured Grants) scenarios.

Step 2. In a case that the first uplink grant is for scheduling newly transmitted data, the UE first needs to determine, based on received scheduling signaling, a logical channel that can be transmitted on the uplink transmission resource designated by the first uplink grant, meaning that the UE needs to select a logical channel to be multiplexed into the MAC PDU corresponding to the first uplink grant. At least the following judgment principle is included: a logical channel is allowed to be multiplexed into the MAC PDU corresponding to the first uplink grant only in a case that a configuration of enabling or disabling of HARQ uplink retransmission for the corresponding logical channel is the same as a configuration of enabling or disabling of HARQ uplink retransmission for a first HARQ process, meaning that data of the corresponding logical channel is allowed to be transmitted on the resource designated by the first uplink grant.

Disabling HARQ uplink retransmission means that the network side does not need to schedule retransmission based on a decoding status of uplink transmission data of the UE; and enabling HARQ uplink retransmission means that the network side needs to schedule retransmission based on a decoding status of uplink transmission data of the UE.

In this case, the configuration of enabling or disabling of HARQ uplink retransmission for the logical channel can be one of the following:
(1) prescribed by a protocol; and
(2) configured/pre-configured by a network side. For example, in a case that the network side device configures/pre-configures a logical channel 1 with HARQ uplink retransmission enabled, the logical channel 1 can transmit only data with HARQ uplink retransmission enabled; and in a case that the network side device configures/pre-configures the logical channel 1 with HARQ uplink retransmission disabled, the logical channel 1 can transmit only data with HARQ uplink retransmission disabled.

A configuration of enabling or disabling of HARQ uplink retransmission for each HARQ process can be one of the following:

(1) prescribed by a protocol; and
(2) configured/pre-configured by a network side. For example, in a case that the network side device configures/pre-configures a HARQ process 1 with HARQ uplink retransmission enabled, the HARQ process 1 can transmit only data with HARQ uplink retransmission enabled; and in a case that the network-side configures/pre-configures the HARQ process 1 with HARQ uplink retransmission disabled, the HARQ process 1 can transmit only data with HARQ uplink retransmission disabled.

An example for step 2 is: a first HARQ process is identified by HARQ process ID 1, and in a case that the HARQ process identified by HARQ process ID 1 is configured with HARQ uplink retransmission disabled, a logical channel is allowed to be multiplexed into the MAC PDU corresponding to the first uplink grant only when a configuration of enabling or disabling of HARQ uplink retransmission for the logical channel is the same as a configuration of enabling or disabling of HARQ uplink retransmission for the first HARQ process, meaning that only the logical channel configured with HARQ uplink retransmission disabled is allowed to be multiplexed into the MAC PDU corresponding to the first uplink grant. More specifically, in a case that a logical channel 1 and a logical channel 2 are configured with HARQ uplink retransmission disabled, only the logical channel 1 and the logical channel 2 are allowed to be multiplexed into the MAC PDU corresponding to the first uplink grant; and in a case that configurations for a logical channel 3 and a logical channel 4 are enabling HARQ uplink retransmission, the logical channel 3 and the logical channel 4 are not allowed to be multiplexed into the MAC PDU corresponding to the first uplink grant.

For another example, in a case that the HARQ process identified by HARQ process ID 1 is configured with HARQ uplink retransmission enabled, a logical channel is allowed to be multiplexed into the MAC PDU corresponding to the first uplink grant only when a configuration of enabling or disabling of HARQ uplink retransmission for the logical channel is the same as a configuration of enabling or disabling of HARQ uplink retransmission for the first HARQ process, meaning that only the logical channel configured with HARQ uplink retransmission enabled is allowed to be multiplexed into the MAC PDU corresponding to the first uplink grant. More specifically, in a case that a logical channel 1 and a logical channel 2 are configured with HARQ uplink retransmission disabled, only the logical channel 1 and the logical channel 2 are not allowed to be multiplexed into the MAC PDU corresponding to the first uplink grant; and in a case that a logical channel 3 and a logical channel 4 are configured with HARQ uplink retransmission enabled, only the logical channel 3 and the logical channel 4 are allowed to be multiplexed into the MAC PDU corresponding to the first uplink grant.

Embodiment 3

In this embodiment, the UE determines a logical channel that can be multiplexed into the MAC PDU corresponding to the first uplink grant, based on an association (or mapping relationship) between logical channels and HARQ process IDs and a HARQ process ID indicated by UE scheduling signaling. This embodiment includes the following steps.

Step 1. The UE obtains the following information:
(1) the first uplink grant of this UE; and
(2) a first HARQ process scheduled by the first uplink grant, where the first HARQ process is identified by a first HARQ process ID, and the first HARQ process corresponds to the target HARQ process in the previous embodiment.

For example, in step 1, the UE listens to downlink control channels and obtains scheduling signaling (such as DCI), where the scheduling signaling contains at least the foregoing two items, and this example is applicable to dynamic scheduling (Dynamically allocate) scenarios.

For another example, in step 1, the UE obtains the foregoing two items based on configuration information. This example is applicable to configured grant (Configured Grants) scenarios.

Step 2. When the first uplink grant is for scheduling newly transmitted data, the UE first needs to determine a logical channel that can be transmitted on an uplink transmission resource designated by the first uplink grant, that is, the UE needs to select a logical channel to be multiplexed into the MAC PDU corresponding to the first uplink grant. At least the following judgment principle is included: a logical channel is allowed to be multiplexed into the MAC PDU corresponding to the first uplink grant only when the logical channel is associated with a HARQ process. Specifically, the logical channel may be associated with one or more HARQ processes, typically, a HARQ process is identified by a HARQ process ID, and a HARQ process ID may identify a unique HARQ process. More specifically, the logical channel may be configured with a HARQ process ID list, and the logical channel being associated with a HARQ process means that the HARQ process ID list contains the HARQ process ID corresponding to the first HARQ process.

The HARQ process ID list configured for the logical channel can be one of the following:
(1) prescribed by a protocol; and
(2) configured/pre-configured by a network side.

For example, a HARQ process ID list configured for a logical channel 1 includes HARQ process ID 1 and HARQ process ID 2; a HARQ process ID list configured for a logical channel 2 includes HARQ process ID 3 and HARQ process ID 4; and a HARQ process ID list configured for a logical channel 3 includes HARQ process ID 1, HARQ process ID 2, and HARQ process ID 4. One HARQ process ID uniquely identifies one HARQ process.

In a case that the first HARQ process scheduled by the first uplink grant is identified by HARQ process ID 1, a logical channel is allowed to be multiplexed into the MAC PDU corresponding to the first uplink grant only when a HARQ process ID list configured for the logical channel contains the HARQ process ID corresponding to the first HARQ process. In this example, that is, only the logical channel 1 and the logical channel 3 are allowed to be multiplexed into the MAC PDU corresponding to the first uplink grant.

It should be noted that the resource allocation method provided by the embodiments of this application may be executed by a resource allocation apparatus or a control module for executing the resource allocation method in the resource allocation apparatus. The resource allocation apparatus executing the resource allocation method is used as an example in this embodiment of this application to illustrate the resource allocation apparatus provided by the embodiments of this application.

Figure 3:
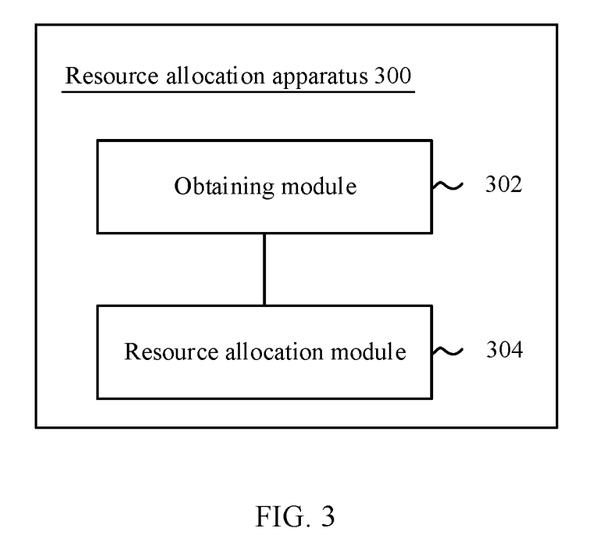
FIG. 3 is a schematic structural diagram of a resource allocation apparatus according to an embodiment of this application.

FIG. 3 is a schematic structural diagram of a resource allocation apparatus according to an embodiment of this application. The apparatus may correspond to a terminal in another embodiment. As shown in FIG. 3, the apparatus 300 includes the following modules:

an obtaining module 302, configured to obtain a first uplink grant for new transmission; and a resource allocation module 304, configured to perform resource allocation for a resource designated by the first uplink grant, based on at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes.

The resource allocation apparatus provided by the embodiment of this application may perform resource allocation for the resource designated by the first uplink grant, based on at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes. The embodiments of this application provide an effective solution for resource allocation in the case of enabling or disabling HARQ uplink retransmission, thereby enhancing communication effectiveness.

In addition, the case of enabling or disabling of HARQ uplink retransmission is considered in the embodiments of this application, such that best efforts are made to avoid simultaneously multiplexing data of a logical channel with HARQ uplink retransmission enabled and data of a logical channel with HARQ uplink retransmission disabled into the MAC PDU corresponding to the first uplink grant, thereby improving the quality of service of data streams.

Optionally, as in an embodiment, the resource allocation module 304 is configured to: in a case that a configuration of enabling or disabling of HARQ uplink retransmission for a target logical channel matches a feature of enabling or disabling of HARQ uplink retransmission as indicated by the HARQ uplink retransmission indication, allow data of the target logical channel to be transmitted on the resource designated by the first uplink grant. The HARQ uplink retransmission indication is used to indicate that the first uplink grant is for scheduling transmission with HARQ uplink retransmission disabled or transmission with HARQ uplink retransmission enabled.

Optionally, as in an embodiment, that a configuration of enabling or disabling of HARQ uplink retransmission for a target logical channel matches a feature of enabling or disabling of HARQ uplink retransmission as indicated by the HARQ uplink retransmission indication includes at least one of the following: the configuration for the target logical channel is enabling HARQ uplink retransmission, and the HARQ uplink retransmission indication is used to indicate that transmission with HARQ uplink retransmission enabled is to be scheduled; and the configuration for the target logical channel is disabling HARQ uplink retransmission, and the HARQ uplink retransmission indication is used to indicate that transmission with HARQ uplink retransmission disabled is to be scheduled.

Optionally, as in an embodiment, the resource allocation module 304 is configured to: in a case that a configuration of enabling or disabling of HARQ uplink retransmission for a target logical channel matches a configuration of enabling or disabling of HARQ uplink retransmission for a target HARQ process, allow data of the target logical channel to be transmitted on a resource designated by the first uplink grant; where the target HARQ process is a HARQ process associated with the first uplink grant.

Optionally, as in an embodiment, that a configuration of enabling or disabling of HARQ uplink retransmission for a target logical channel matches a configuration of enabling or disabling of HARQ uplink retransmission for a target HARQ process includes at least one of the following: the configuration for the target logical channel is enabling HARQ uplink retransmission, and the configuration for the target HARQ process is enabling HARQ uplink retransmission; and the configuration for the target logical channel is disabling HARQ uplink retransmission, and the configuration for the target HARQ process is disabling HARQ uplink retransmission.

Optionally, as in an embodiment, the resource allocation module 304 is configured to: in a case that a target logical channel is associated with a target HARQ process, allow data of the target logical channel to be transmitted on a resource designated by the first uplink grant; where the target HARQ process is a HARQ process associated with the first uplink grant.

Optionally, as in an embodiment, the target logical channel is configured with a HARQ process ID list. That a target logical channel is associated with a target HARQ process includes: the target HARQ process has an ID located within the HARQ process ID list.

Optionally, as in an embodiment, the apparatus 300 further includes an obtaining module configured to perform one of the following: obtaining the configuration of enabling or disabling of HARQ uplink retransmission for the target logical channel using at least one of the following manners: pre-definition, configuration by a network side device, and pre-configuration by a network side device; obtaining the configuration of enabling or disabling of HARQ uplink retransmission for the target HARQ process using at least one of the following manners: pre-definition, configuration by a network side device, and pre-configuration by a network side device; and obtaining a HARQ process ID list configured for the target logical channel using at least one of the following manners: pre-definition, configuration by a network side device, and pre-configuration by a network side device.

Optionally, as in an embodiment, the HARQ uplink retransmission indication is indicated by scheduling signaling; or the HARQ uplink retransmission indication is configured by a network side device.

For the apparatus 300 according to this embodiment of this application, reference may be made to the processes of the method 200 in the corresponding embodiment of this application, and the units/modules of the apparatus 300 and other operations and/or functions described above are respectively intended to implement the corresponding processes in the method 200, with the same or equivalent technical effects achieved. For brevity, details are not described herein again.

The resource allocation apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (Network Attached Storage, NAS), a personal computer (personal computer, PC), a television (television, TV), a teller machine, a self-service machine, or the like, which is not specifically limited in this embodiment of this application.

The resource allocation apparatus in this embodiment of this application may be an apparatus with an operating system. The operating system may be an Android (Android) operating system, an iOS operating system, or another possible operating system, and is not specifically limited in the embodiment of this application.

The resource allocation apparatus provided by this embodiment of this application can implement the processes implemented in the method embodiment in FIG. 2, with the same technical effects achieved. To avoid repetition, details are not described herein again.

Figure 4:
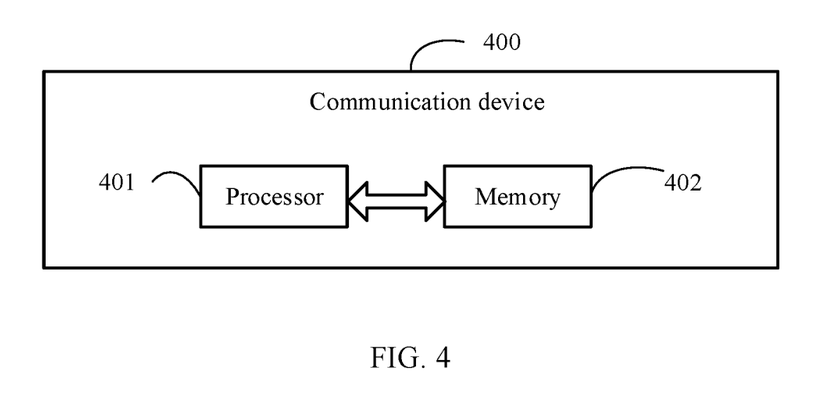
FIG. 4 is a schematic structural diagram of a communication device according to an embodiment of this application.

Optionally, as shown in FIG. 4, an embodiment of this application further provides a communications device 400 including a processor 401, a memory 402, and a program or instructions stored in the memory 402 and capable of running on the processor 401. For example, when the communications device 400 is a terminal, the program or instructions are executed by the processor 401 to implement the processes of the foregoing resource allocation method embodiments, with the same technical effects achieved.

Figure 5:
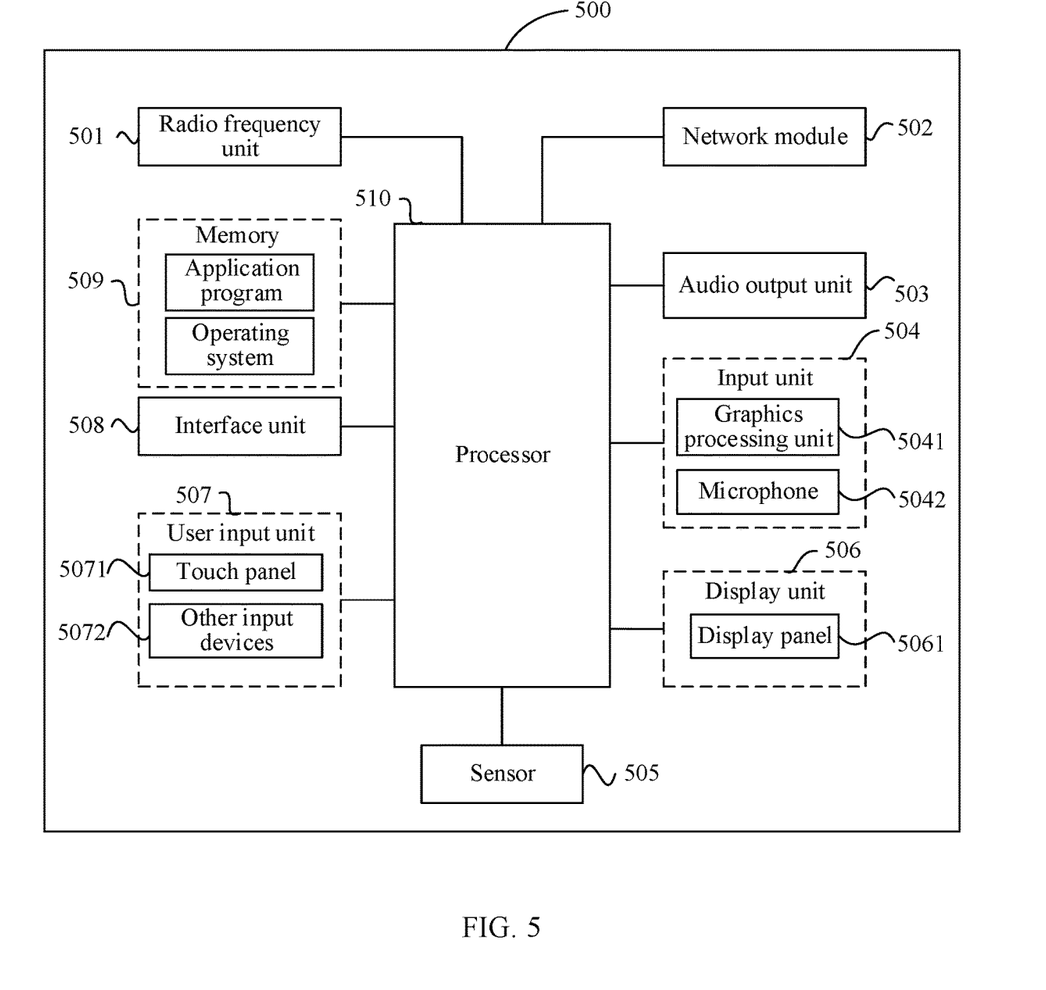
FIG. 5 is a schematic structural diagram of a terminal according to an embodiment of this application.

FIG. 5 is a schematic diagram of a hardware structure of a terminal for implementing the embodiments of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power supply (such as a battery) for supplying power to the components. The power supply may be logically connected to the processor 510 via a power management system. In this way, functions such as charge management, discharge management, and power consumption management are implemented via the power management system. The terminal structure shown in FIG. 5 does not constitute any limitation on the terminal. The terminal may include more or fewer components than shown in the figure, or a combination of some components, or the components disposed differently. Details are not described herein again.

It should be understood that in this embodiment of this application, the input unit 504 may include a graphics processing unit (graphics processing unit, GPU) S041 and a microphone S042. The graphics processing unit S041 processes image data of a static picture or a video that is obtained by an image capture apparatus (for example, a camera) in an image capture mode or a video capture mode. The display unit 506 may include a display panel S061, and the display panel S061 may be configured in a form of a liquid crystal display, an organic light-emitting diode display, and the like. The user input unit 507 includes a touch panel S071 and other input devices S072. The touch panel S071 is also referred to as a touchscreen. The touch panel S071 may include two parts: a touch detection apparatus and a touch controller. The other input devices S072 may include but are not limited to a physical keyboard, a function key (such as a volume control key or a power on/off key), a trackball, a mouse, a joystick, and the like. Details are not described herein.

In this embodiment of this application, the radio frequency unit 501 sends downlink data received from a network side device to the processor 510 for processing, and in addition, sends uplink data to the network side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may mainly include a program or instruction storage region and a data storage region. The program or instruction storage region may store an operating system, an application program or instructions required by at least one function (for example, an audio play function or an image play function), and the like. In addition, the memory 509 may include a high-speed random access memory, and may further include a non-volatile memory, where the non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 510 may include one or more processing units. Optionally, the processor 510 may integrate an application processor and a modem processor. The application processor mainly processes an operating system, a user interface, application programs or instructions, or the like. The modem processor mainly processes wireless communication, for example, a baseband processor. It can be understood that the modem processor may be alternatively not integrated in the processor 510.

The radio frequency unit 501 is configured to obtain a first uplink grant for new transmission; and the processor 510 is configured to perform resource allocation for a resource designated by the first uplink grant, based on at least one of the following: HARQ uplink retransmission indication, configuration of enabling or disabling of HARQ uplink retransmission for a HARQ process, configuration of enabling or disabling of HARQ uplink retransmission for a logical channel; and association between logical channels and HARQ processes.

In this embodiment of this application, the terminal may perform resource allocation for a resource designated by the first uplink grant, according to at least one of the following: HARQ uplink retransmission indication, configuration of enabling or disabling of HARQ uplink retransmission for a HARQ process, configuration of enabling or disabling of HARQ uplink retransmission for a logical channel, and association between logical channels and HARQ processes. This embodiment of this application provides an effective solution for resource allocation in the case of enabling or disabling HARQ uplink retransmission, thereby enhancing communication effectiveness.

In addition, the case of enabling or disabling of HARQ uplink retransmission is considered in this embodiment of this application, such that best efforts are made to avoid simultaneously multiplexing data of a logical channel with HARQ uplink retransmission enabled and data of a logical channel with HARQ uplink retransmission disabled into the MAC PDU corresponding to the first uplink grant, thereby improving the quality of service of data streams.

The terminal 500 provided by this embodiment of this application can further implement the processes of the resource allocation method embodiments, with the same technical effects achieved. To avoid repetition, details are not described herein again.

An embodiment of this application further provides a readable storage medium, where the readable storage medium may be volatile or non-volatile and stores a program or instructions. When the program or instructions are executed by a processor, the processes of the foregoing resource allocation method embodiments can be implemented, with the same technical effects achieved. To avoid repetition, details are not described herein again.

The processor may be a processor in the terminal described in the foregoing embodiment. The readable storage medium includes a computer-readable storage medium, such as a computer read-only memory (Read-Only Memory, ROM), a random access memory (Random Access Memory, RAM), a magnetic disk, or an optical disc.

An embodiment of this application further provides a chip, where the chip includes a processor and a communication interface. The communication interface is coupled to the processor, and the processor is configured to run a program or instructions to implement the processes of the foregoing resource allocation method embodiments, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application provides a computer program product, where the computer program product is stored in a non-transient storage medium, and the computer program product is executed by at least one processor to implement the processes of the foregoing resource allocation method embodiments, with the same technical effects achieved. To avoid repetition, details are not repeated herein.

An embodiment of this application further provides a communication device, configured to execute the processes of the foregoing resource allocation method embodiments, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network side device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from the principle of this application and the protection scope of the claims, and all such manners fall within the protection scope of this application.

What is claimed is:

1. A resource allocation method, wherein the method comprises:
  obtaining, by a terminal, a first uplink grant for new transmission; and
  performing resource allocation for a resource designated by the first uplink grant, according to at least one of following:
  hybrid automatic repeat request HARQ uplink retransmission indication, configuration of enabling or disabling of HARQ uplink retransmission for a HARQ process, configuration of enabling or disabling of HARQ uplink retransmission for a logical channel, and association between logical channels and HARQ processes;
  wherein the performing resource allocation for a resource designated by the first uplink grant, according to at least one of the following comprises:
  in a case that a configuration of enabling or disabling of HARQ uplink retransmission for a target logical channel matches a feature of enabling or disabling of HARQ uplink retransmission as indicated by the HARQ uplink retransmission indication, allowing data of the target logical channel to be transmitted on the resource designated by the first uplink grant; wherein
  the HARQ uplink retransmission indication is used to indicate that the first uplink grant is for scheduling transmission with HARQ uplink retransmission disabled or transmission with HARQ uplink retransmission enabled.

2. The method according to claim 1, wherein that a configuration of enabling or disabling of HARQ uplink retransmission for a target logical channel matches a feature of enabling or disabling of HARQ uplink retransmission as indicated by the HARQ uplink retransmission indication comprises at least one of the following:
  the configuration for the target logical channel is enabling HARQ uplink retransmission, and the HARQ uplink retransmission indication is used to indicate that transmission with HARQ uplink retransmission enabled is to be scheduled; and
  the configuration for the target logical channel is disabling HARQ uplink retransmission, and the HARQ uplink retransmission indication is used to indicate that transmission with HARQ uplink retransmission disabled is to be scheduled.

3. The method according to claim 1, wherein the performing resource allocation for a resource designated by the first uplink grant, according to at least one of following comprises:

in a case that a configuration of enabling or disabling of HARQ uplink retransmission for a target logical channel matches a configuration of enabling or disabling of HARQ uplink retransmission for a target HARQ process, allowing data of the target logical channel to be transmitted on the resource designated by the first uplink grant; wherein the target HARQ process is a HARQ process associated with the first uplink grant.

4. The method according to claim 3, wherein that a configuration of enabling or disabling of HARQ uplink retransmission for a target logical channel matches a configuration of enabling or disabling of HARQ uplink retransmission for a target HARQ process comprises at least one of the following:

the configuration for the target logical channel is enabling HARQ uplink retransmission, and the configuration for the target HARQ process is enabling HARQ uplink retransmission; and the configuration for the target logical channel is disabling HARQ uplink retransmission, and the configuration for the target HARQ process is disabling HARQ uplink retransmission.

5. The method according to claim 3, wherein the method further comprises at least one of the following:

obtaining the configuration of enabling or disabling of HARQ uplink retransmission for the target logical channel by using at least one of following manners: pre-definition, configuration by a network side device, and pre-configuration by a network side device;

obtaining the configuration of enabling or disabling of HARQ uplink retransmission for the target HARQ process by using at least one of following manners: pre-definition, configuration by a network side device, and pre-configuration by a network side device; and obtaining a HARQ process ID list configured for the target logical channel by using at least one of following manners: pre-definition, configuration by a network side device, and pre-configuration by a network side device.

6. The method according to claim 1, wherein the performing resource allocation for a resource designated by the first uplink grant, according to at least one of the following comprises:

in a case that a target logical channel is associated with a target HARQ process, allowing data of the target logical channel to be transmitted on the resource designated by the first uplink grant; wherein the target HARQ process is a HARQ process associated with the first uplink grant.

7. The method according to claim 6, wherein the target logical channel is configured with a HARQ process identification ID list;

wherein that a target logical channel is associated with a target HARQ process comprises:

the target HARQ process has an ID located within the HARQ process ID list.

8. The method according to claim 1, wherein the HARQ uplink retransmission indication is indicated by scheduling signaling or configured by a network side device.

9. A terminal, comprising a processor, a memory, and a program or instructions stored on the memory and capable of running on the processor, wherein the program or instructions are executed by the processor to perform:

obtaining, by a terminal, a first uplink grant for new transmission; and performing resource allocation for a resource designated by the first uplink grant, according to at least one of following:

hybrid automatic repeat request HARQ uplink retransmission indication, configuration of enabling or disabling of HARQ uplink retransmission for a HARQ process, configuration of enabling or disabling of HARQ uplink retransmission for a logical channel, and association between logical channels and HARQ processes;

wherein when performing resource allocation for a resource designated by the first uplink grant, the program or instructions are executed by the processor to perform at least one of the following:

in a case that a configuration of enabling or disabling of HARQ uplink retransmission for a target logical channel matches a feature of enabling or disabling of HARQ uplink retransmission as indicated by the HARQ uplink retransmission indication, allowing data of the target logical channel to be transmitted on the resource designated by the first uplink grant; wherein the HARQ uplink retransmission indication is used to indicate that the first uplink grant is for scheduling transmission with HARQ uplink retransmission disabled or transmission with HARQ uplink retransmission enabled.

10. The terminal according to claim 9, wherein that a configuration of enabling or disabling of HARQ uplink retransmission for a target logical channel matches a feature of enabling or disabling of HARQ uplink retransmission as indicated by the HARQ uplink retransmission indication comprises at least one of the following:

the configuration for the target logical channel is enabling HARQ uplink retransmission, and the HARQ uplink retransmission indication is used to indicate that transmission with HARQ uplink retransmission enabled is to be scheduled; and the configuration for the target logical channel is disabling HARQ uplink retransmission, and the HARQ uplink retransmission indication is used to indicate that transmission with HARQ uplink retransmission disabled is to be scheduled.

11. The terminal according to claim 9, wherein when performing resource allocation for a resource designated by the first uplink grant, the program or instructions are executed by the processor to perform at least one of following:

in a case that a configuration of enabling or disabling of HARQ uplink retransmission for a target logical channel matches a configuration of enabling or disabling of HARQ uplink retransmission for a target HARQ process, allowing data of the target logical channel to be transmitted on the resource designated by the first uplink grant; wherein the target HARQ process is a HARQ process associated with the first uplink grant.

12. The terminal according to claim 11, wherein that a configuration of enabling or disabling of HARQ uplink retransmission for a target logical channel matches a configuration of enabling or disabling of HARQ uplink retransmission for a target HARQ process comprises at least one of the following:
the configuration for the target logical channel is enabling HARQ uplink retransmission, and the configuration for the target HARQ process is enabling HARQ uplink retransmission; and
the configuration for the target logical channel is disabling HARQ uplink retransmission, and the configuration for the target HARQ process is disabling HARQ uplink retransmission.

13. The terminal according to claim 11, wherein the program or instructions are executed by the processor to perform at least one of the following:
obtaining the configuration of enabling or disabling of HARQ uplink retransmission for the target logical channel by using at least one of following manners: pre-definition, configuration by a network side device, and pre-configuration by a network side device;
obtaining the configuration of enabling or disabling of HARQ uplink retransmission for the target HARQ process by using at least one of following manners: pre-definition, configuration by a network side device, and pre-configuration by a network side device; and
obtaining a HARQ process ID list configured for the target logical channel by using at least one of following manners: pre-definition, configuration by a network side device, and pre-configuration by a network side device.

14. The terminal according to claim 9, wherein when performing resource allocation for a resource designated by the first uplink grant, the program or instructions are executed by the processor to perform at least one of the following:
in a case that a target logical channel is associated with a target HARQ process, allowing data of the target logical channel to be transmitted on the resource designated by the first uplink grant; wherein
the target HARQ process is a HARQ process associated with the first uplink grant.

15. The terminal according to claim 14, wherein the target logical channel is configured with a HARQ process identification ID list;
wherein that a target logical channel is associated with a target HARQ process comprises:
the target HARQ process has an ID located within the HARQ process ID list.

16. The terminal according to claim 9, wherein the HARQ uplink retransmission indication is indicated by scheduling signaling or configured by a network side device.

17. A non-transitory readable storage medium, wherein the readable storage medium stores a program or instructions, and the program or instructions are executed by a processor to perform: obtaining, by a terminal, a first uplink grant for new transmission;
and performing resource allocation for a resource designated by the first uplink grant, according to at least one of following: hybrid automatic repeat request HARQ uplink retransmission indication, configuration of enabling or disabling of HARQ uplink retransmission for a HARQ process, configuration of enabling or disabling of HARQ uplink retransmission for a logical channel, and association between logical channels and HARQ processes; wherein the performing resource allocation for a resource designated by the first uplink grant, according to at least one of the following comprises: in a case that a configuration of enabling or disabling of HARQ uplink retransmission for a target logical channel matches a feature of enabling or disabling of HARQ uplink retransmission as indicated by the HARQ uplink retransmission indication, allowing data of the target logical channel to be transmitted on the resource designated by the first uplink grant; wherein the HARQ uplink retransmission indication is used to indicate that the first uplink grant is for scheduling transmission with HARQ uplink retransmission disabled or transmission with HARQ uplink retransmission enabled.

18. The non-transitory readable storage medium according to claim 17, wherein when performing resource allocation for a resource designated by the first uplink grant, the program or instructions are executed by a processor to perform at least one of following: in a case that a configuration of enabling or disabling of HARQ uplink retransmission for a target logical channel matches a configuration of enabling or disabling of HARQ uplink retransmission for a target HARQ process, allowing data of the target logical channel to be transmitted on the resource designated by the first uplink grant; wherein the target HARQ process is a HARQ process associated with the first uplink grant.

* * * * *